United States Patent [19]
Taek-hyun

[11] Patent Number: 5,134,466
[45] Date of Patent: Jul. 28, 1992

[54] COMBINED WHITE BALANCE SWITCHING DEVICE OF VIDEO CAMERA

[75] Inventor: Yoon Taek-hyun, Kwachon, Rep. of Korea

[73] Assignee: Goldstar Co., Ltd., Rep. of Korea

[21] Appl. No.: 628,611

[22] Filed: Dec. 17, 1990

[30] Foreign Application Priority Data

Dec. 30, 1989 [KR] Rep. of Korea ............. 89-21158

[51] Int. Cl.$^5$ .................... H04N 9/73; H04N 9/07
[52] U.S. Cl. ................................. 358/29; 358/41
[58] Field of Search ............. 358/29 C, 29, 41, 44

[56] References Cited

U.S. PATENT DOCUMENTS

| | | | |
|---|---|---|---|
| 4,739,392 | 4/1988 | Ueda et al. | 358/29 C |
| 4,739,393 | 4/1988 | Seki et al. | 358/29 C |
| 4,811,086 | 3/1989 | Hieda | 358/29 C |
| 4,931,856 | 6/1990 | Hieda et al. | 358/29 C |

Primary Examiner—James J. Groody
Assistant Examiner—Michael H. Lee
Attorney, Agent, or Firm—Anthony J. Casella; Gerald E. Hespos

[57] ABSTRACT

The present invention relates to a combined white balance switching device for video camera, and more particularly to a combined white balance switching device that improves over-all color reproduction capability by mainly employing sensor type and in case where color temperature becomes different, switching to image signal sensing type. A sensor-type white balance device adjusts white balance by detecting B(blue) and R(red) components from incident light coming through a white cap 15, comparing said B(blue) and R(red) with reference voltages and outputting control voltages b,a from controllers 22, 23 to control Gain-Controller's 10,9 of color signal shaping circuit 100, and when difference of color temperature values becomes great, an image-signal-sensing-type white balance device adjusts the white balance by detecting R-Y(red-luminance), B-Y(blue-luminance) components from R-Y(red-luminance), B-Y(blue-luminance) matrices 12, 13, comparing said R-Y, B-Y components with reference voltages V1, V2, outputting control voltages c,d as much as the differences between said R-Y, B-Y components and said reference voltages V1, V2 and thus controlling Gain-Controller's 9, 10.

4 Claims, 5 Drawing Sheets

COMBINED WHITE BALANCE SWITCHING DEVICE OF VIDEO CAMERA

BACKGROUND OF THE INVENTION

The present invention relates to a combined white balance switching device for video and more particularly to a combined white balance switching device that improves over-all color reproduction capability by mainly employing sensor type and in case that the color temperature becomes different, switching to image signal sensing type.

As illustrated in the FIG. 1, a conventional video camera consists: a lens 1 that collects light; an image element 2 that converts light signals to electronic signals a signal processor 3 that shapes the output of the image element 2; a LPF (Low Pass Filter) 4; a mixer (Y processor and Y/C Mix) 5; a color signal shaping circuit 100 that is composed of detectors 8 at which form the color signal Gain-Controller's 9 and 10, R−Y and B−Y matrices 12 and 13, color processor 14; and a white balance circuit 200.

In the conventional video camera, the white balance circuit 200 is either of a sensor type or of an image signal sensing type.

As shown in FIG. 2, the sensor type white balance device consists of: a white balance sensor that is composed of a white cap 15, B(Blue)/R(Red) filters 16 and 17, and light receiving diodes 18 and 19; comparators 20 and 21 that compare output of the white balance sensor with a reference voltage; and controllers 22 and 23. As shown in FIG. 3, the image signal sensing white balance type device having comparators 24 and 25 that detect the image signal, compare R−Y and B−Y components of outputs with reference voltages V1 and V2, and produce adjusted voltages.

The sensor type white balance device as shown in FIG. 2 adjusts the white balance by detecting B(Blue) and R(Red) components out of incident light that come through the white cap 15 at a B(Blue) filter 16 and an R(Red) filter, comparing the B and R components with reference levels at the comparators 20 and 21, and controlling the Gain-Controller's 9 and 10 of the color signal shaping circuit 100 by control voltages b and a provided from the controllers 22 and 23. That is, when the color temperature state is "A" as shown in FIG. 4, white balance is achieved by adjusting color ratio to R:G:B1:1:1 by decreasing R-component(r) and increasing B-component(b) to match G-component(g). The image signal sensing type white balance device as shown in FIG. 3 adjusts the white balance by detecting R−Y and B−Y components from the signal line and the detected R−Y and B−Y components are compared with the reference voltages V1, V2 at the comparators 24, 25 and then control voltages c and d, which are as much as the differences between the R−Y and B−Y components, are outputted to control the Gain-Controller's 9 and 10.

In the sensor type as shown in FIG. 2, however, there is a setback that correct color reproduction cannot be achieved when there is a difference between a color temperature sensed by the sensor and a color temperature of a spot to which incident light through the lens is cast, because the white balance is performed by using the sensor in disregard of the image signal. On the other hand, in the image signal sensing type as shown in FIG. 3, the setback of the sensor type does not exist but there are other setbacks: one that single color having particularly R,G, or B component is recognized as the white color during processing images, so that color adjustment is performed based on that recognition; another that color is hampered when zooming is performed.

SUMMARY OF THE INVENTION

It is therefore an object of the present invention to provide a white balance switching device for video camera which is capable of handling setbacks of both the sensor type and the image signal sensing type.

The white balance switching device of the subject invention includes a sensor type white balance device which detects blue and red components of incident light and compares those components with reference voltages. Based on these comparisons, R−Y and B−Y control voltages are outputted. An image signal sensing type white balance device also is provided for detecting R−Y and B−Y image signal component from the signal line and compares these components to reference voltages. Based on these comparisons R−Y and B−Y control voltages are outputted as the differences between the respective R−Y and B−Y components and the reference voltages. The switching device further includes a switching control circuit which compares the R−Y control voltage and the B−Y control voltage of the sensor type white balance device and develops a sensor-type voltage difference. Similarly, the R−Y control voltage and the B−Y control voltage of the image signal sensing type white balance device are compared and an image signal sensing type voltage difference is outputted. The sensor type voltage difference and the image signal sensing type voltage difference then are compared to one another and an input voltage (f) is developed based on this comparison. This input voltage is then compared with pre-determined reference voltages $-V_o$, $+V_o$. A switching circuit then is provided for selectively switching between the sensor type white balance device and the image signal sensing type white balance device in accordance with the comparison of the input voltage with the pre-determined reference voltages $-V_o$, $+V_o$.

DETAILED DESCRIPTION OF THE PRESENT INVENTION

Figure 1:
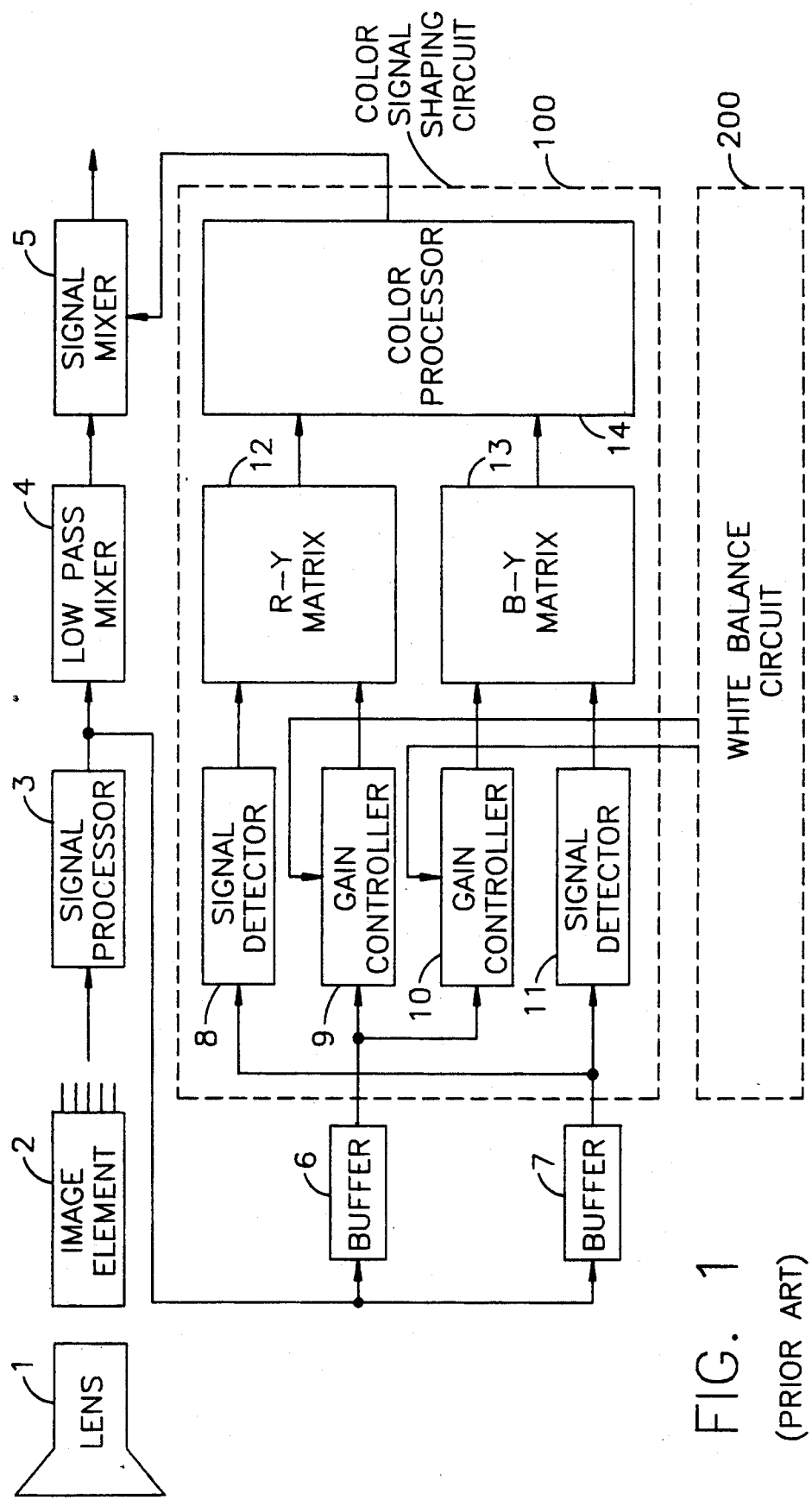
FIG. 1 is a block diagram of an image signal processing device of the prior art.
Figure 2:
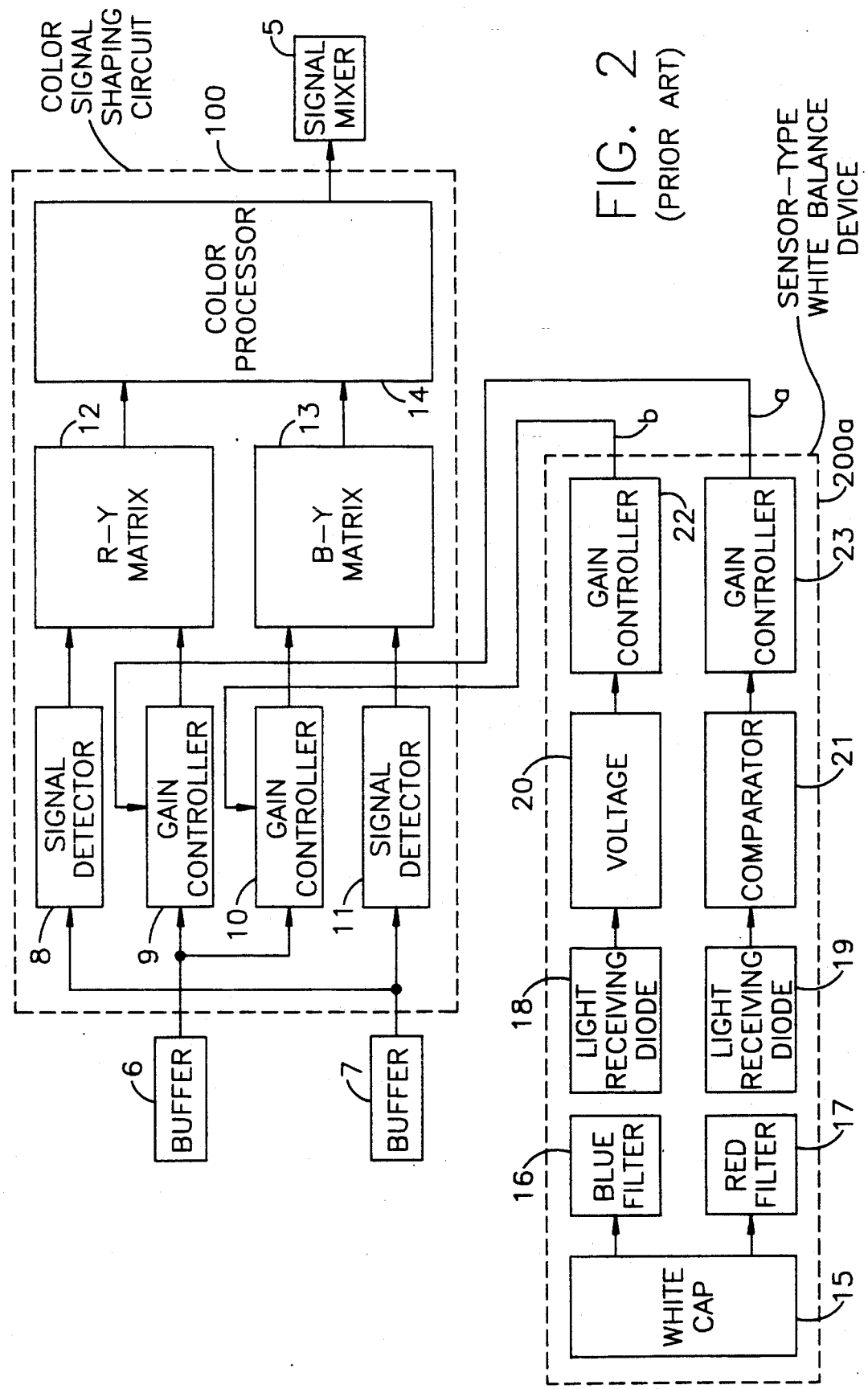
FIG. 2 is a block diagram of a sensor-type white balance device of the prior art.
Figure 3:
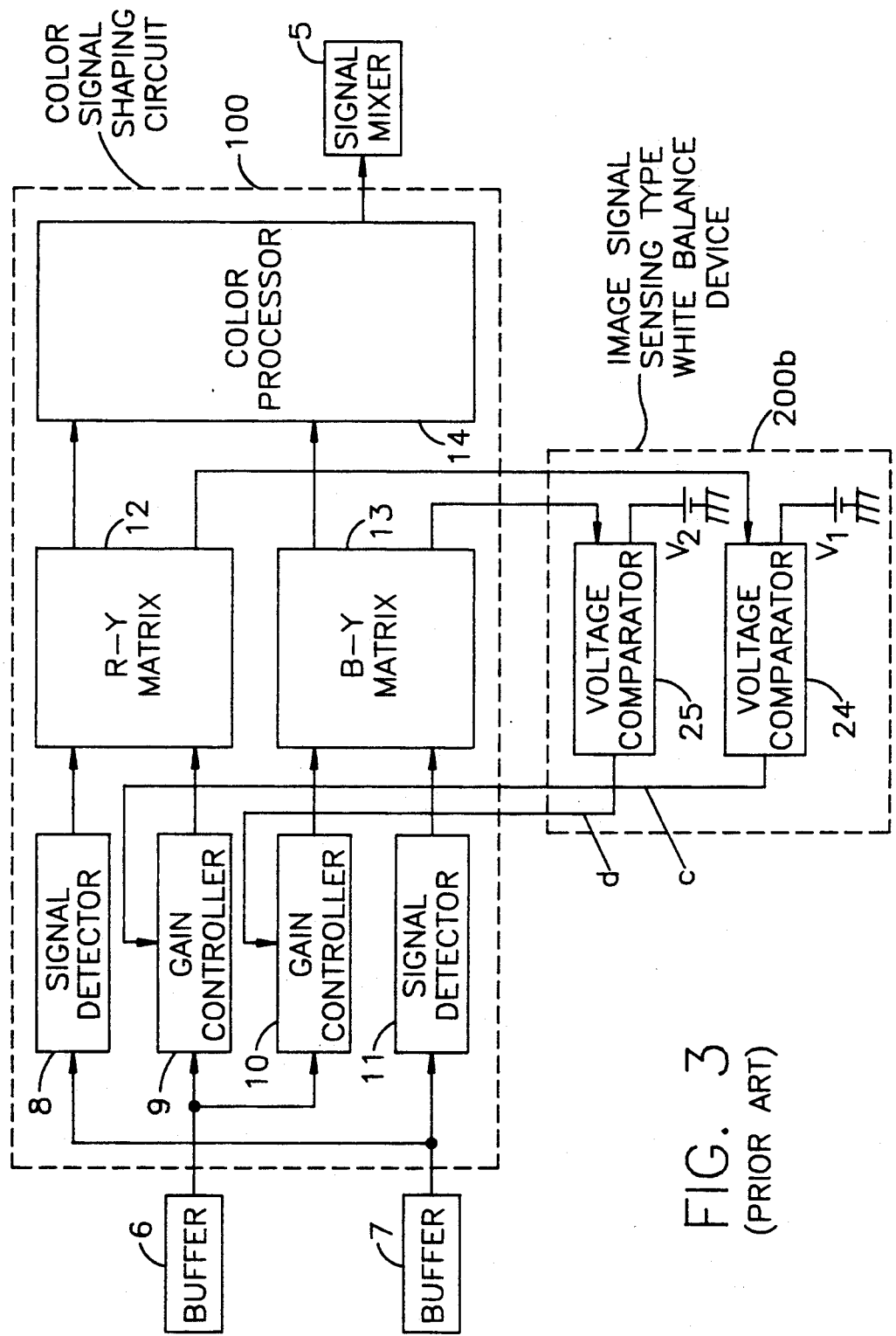
FIG. 3 is a block diagram of an image-signal-sensing type white balance device of the prior art.
Figure 4:
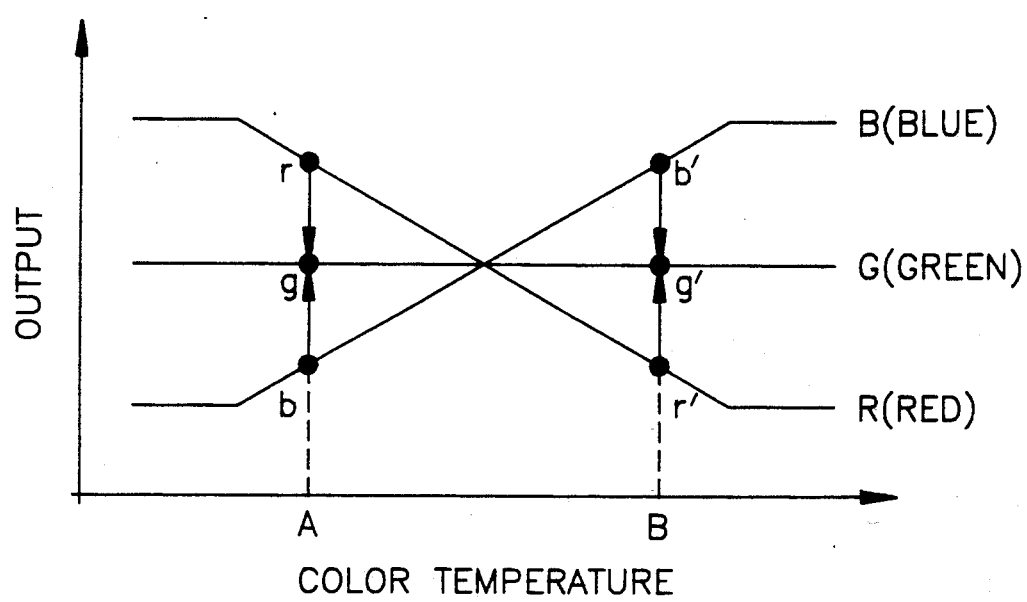
FIG. 4 is a wave-form diagram illustrating white balance control.
Figure 5:
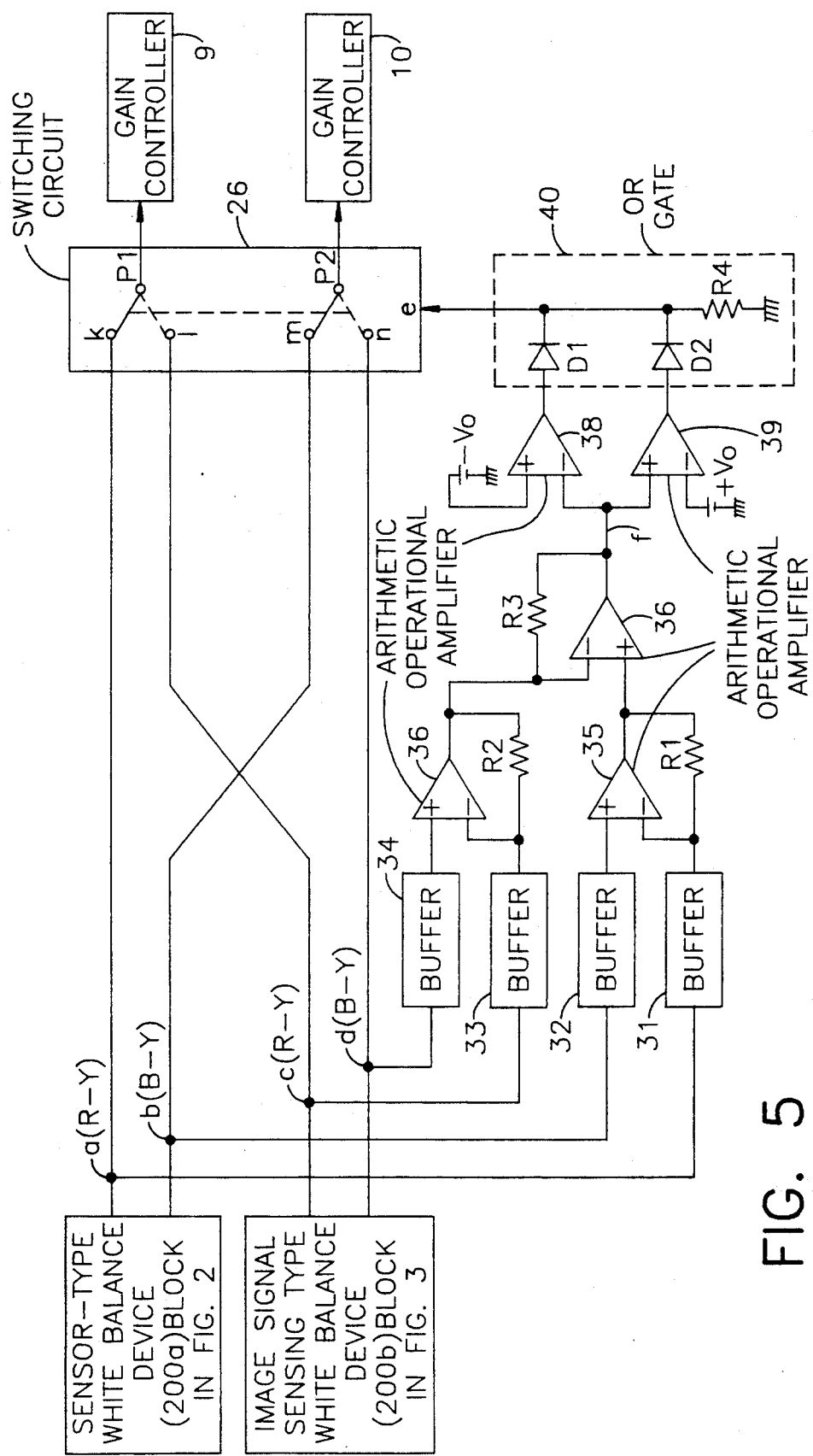
FIG. 5 is a circuit diagram of a combined white balance switching device according to the present invention.

Turning now to FIG. 5, a combined white balance switching device of the present invention consists of: buffers 31 and 32, a resistor R1, and an arithmetic amplifier 35 which compare and amplify R−Y and B−Y control voltages a and b of the sensor type (refer to FIG. 2); buffer 33 and 34, a resistor R2, and an arthmetic amplifier 36 which compare and amplify the R−Y and B−Y control voltage c and d of the image signal sensing type (refer to FIG. 3); an arithmetic amplifier 37 and a resistor R3 that amplifies a voltage difference between the voltages outputted from the arithmetic amplifiers 35 and 36; arithmetic amplifiers 38 and 39 then compare the output voltage f with reference voltages $V_o$, $+V_o$ and a switching circuit 26 that operates, selects and outputs either outputs a,b, of the sensor-type white balance device 200a or outputs c,d of the image-signal-sensing-type white balance device 200b according to outputs of the arithmetic amplifiers 37 and 38. That is, the white balance is adjusted according to control voltage a and b of the sensor type when a control signal e that is applied to the switching circuit 26 is logic low, but the white balance is adjusted according to control voltages c,d of the image signal sensing type by the switching circuit 26 when the control signal e is logic high.

Advantages and benefits of the present invention will become apparent from the following descriptions.

Referring now more descriptively to FIG. 5, the R−Y control voltage a and the B−Y control voltage b of the sensor type are inputted through the buffers 31, 32 and a voltage difference between the R−Y control voltage a and the B−Y control voltage b is amplified at the arithmetic amplifier 35, and in the same manner the R−Y control voltage c and the B−Y control voltage d are inputted through the buffers 33, 34 and a voltage difference between the R−Y control voltage c and the B−Y control voltage d is amplified at the arithmetic amplifier 36.

The, the amplified voltage differences of the two types then are compared at the arithmetic amplifier 37, and an output f of the arithmetic amplifier 37 is inputted to the arithmetic amplifiers 38 and 39, and output of the arithmetic amplifier 39 becomes logic high if the input f is greater than the reference voltage $+V_o$ of an inverse amplification terminal(−) (i.e., $f > +V_o$) and output of the arithmetic amplifier 39 becomes logic low if the input f is smaller than the reference voltage $+V_o$ of the inverse amplification terminal(−) (i.e., $f < +V_o$). On the contrary, output of the arithmetic amplifier 38 becomes logic high if the input f of an inverse amplification terminal(−) of the arithmetic amplifier 38 is smaller than a reference voltage $-V_o$ of a non-inverse amplification terminal(+) (i.e., $f < -V_o$), and output of the arithmatic amplifier 38 becomes low if the input f is greater than the reference voltage $-V_o (f > -V_o)$. The outputs of the arithmetic amplifiers 38, 39 then are applied to a control terminal e of the switching circuit 26 through an OR gate that consists of diodes D1, D2 and OR gate 40. Therefore, since a logic low signal is applied to the control terminal e of the switching circuit 26 if output f of the arithmetic amplifier 37 is $-V_o < f < +V_o$, and a logic high signal is applied if the output f of the arithmetic amplifier 37 is other than $-V_o < f < +V_o$, if smaller values are set for the voltages $-V_o$, $+V_o$, i.e., value of the sensor type differs from color temperature value of the image signal sensing type in a small range corresponding to reference voltages $-V_o$, $+V_o$, the control terminal e of the switching circuit 26 becomes logic low so that terminals P1, P2 are connected with terminals k, m and sensor type operation is performed, but in a contrary case, the terminals P1,P2 are connected with terminals 1, n so that image signal sensing type operation is performed.

As described in the foregoing, the combined white balance switching device for video camera according to the present invention has advantages that the color reproduction can be improved in the sensor type by switching with the image signal sensing type even when the sensing section and the image section have a temperature difference which can hamper correct reproduction of a color, and by mainly employing sensor type to avoid the setback of the image signal sensing type.

What is claimed is:

1. A white balance switch device for a video camera comprising:

a sensor-type white balance means for detecting B(blue) and R(red) components from incident light, comparing said B(blue) and R(red) components of the incident light with reference voltages and outputting R−Y and B−Y control voltages (a and b);

an image-signal-sensing-type white balance means for detecting R−Y (red-luminance), B−Y (blue-luminance) image signal components, comparing said R−Y, B−Y components with reference voltages V1, V2 and outputting R−Y and B−Y control voltages (c, d) as the difference between said R−Y, B−Y components and said reference voltages V1, V2 respectively;

a switching control device comprising:

means for comparing the R−Y control voltage a and the B−Y control voltage b of the sensor-type white balance means and developing a sensor-type voltage difference;

means for comparing the R−Y control voltage c and the B−Y control voltage d of the image signal sensing type white balance means and developing an image signal sensing type voltage difference;

means for comparing the sensor-type voltage difference and the image signal sensing type voltage difference and developing an input voltage (f);

means for comparing the input voltage (f) with predetermined reference voltages $-V_o$, $+V_o$; and switching means for selectively switching between the sensor type white balance means and the image signal sensor type white balance means in accordance with the comparing of the input voltage (f) with the predetermined reference voltages $-V_o$, $+V_o$.

2. A white balance switch device for a video camera according to claim 1, wherein said means for comparing the R−Y control voltage and the B−Y control voltage of the sensor type white balance means comprises a first arithmetic amplifier that amplifies the sensor type voltage difference between the R−Y control voltage (a) and the B−Y control voltage (b) of the sensor type white balance means that are inputted through two buffers which are respectively connected to said R−Y and B−Y control voltages (a and b); the means for comparing the R−Y control voltage (c) and the B−Y control voltage (d) of the image signal sensing type white balance means comprises a second arithmetic amplifier that amplifiers a difference between the R−Y control voltage (c) and the B−Y control voltage (d) of the image signal sensing type white balance means that are inputted through two buffers which are respectively connected to said R−Y and B−Y control voltages (c, d); the means for developing the input voltage (f) comprises a third arithmetic amplifier that amplifies a voltage difference between said first and second arithmetic amplifiers; the means that compares reference voltages $-V_o$ and $+V_o$ with output (f) of said third arithmetic amplifier being defined by fourth and fifth arithmetic amplifiers; and the switching means that switches between the sensor type white balance means and the image signal sensing type white balance means in accordance with the outputs of said fourth and fifth arithmetic amplifiers.

3. A white balance switching device for a video camera as claimed in claim 2, wherein said switching control device is characterized in that the control voltages (a, b) of the sensor type are outputted to an $R-Y/B-Y$ Gain-Controller when the output (f) of said third arithmetic amplifier is $-V_o < f < +V_o$ to given reference voltages $-V_o, +V_o$.

4. A white balance switching device for a video camera as claimed in claim 2, wherein said switching control device is characterized in that the control voltages (c, d) of the image signal sensing type are outputted to an $R-Y/B-Y$ Gain-Controller when the (f) of the third arithmetic amplifier is $f < -V_o, f > +V_o$ to given reference voltages $-V_o, +V_o$.

* * * * *